United States Patent
Yi et al.

(10) Patent No.: US 12,167,481 B2
(45) Date of Patent: Dec. 10, 2024

(54) DEVICE CONTROL METHOD AND TERMINAL

(71) Applicant: Huawei Technologies Co., Ltd., Shenzhen (CN)

(72) Inventors: Li Yi, Shenzhen (CN); Erli Ma, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 17/629,971

(22) PCT Filed: Jul. 20, 2020

(86) PCT No.: PCT/CN2020/103126
§ 371 (c)(1),
(2) Date: Jan. 25, 2022

(87) PCT Pub. No.: WO2021/017934
PCT Pub. Date: Feb. 4, 2021

(65) Prior Publication Data
US 2022/0256626 A1 Aug. 11, 2022

(30) Foreign Application Priority Data
Jul. 26, 2019 (CN) .......................... 201910682532.0

(51) Int. Cl.
*H04W 4/00* (2018.01)
*H04L 12/28* (2006.01)
(Continued)

(52) U.S. Cl.
CPC ......... *H04W 76/14* (2018.02); *H04L 12/2803* (2013.01); *H04L 67/104* (2013.01);
(Continued)

(58) Field of Classification Search
CPC ..... H04W 76/14; H04W 84/12; H04W 12/73; H04W 12/06; H04L 67/104; H04L 12/2803
(Continued)

(56) References Cited

U.S. PATENT DOCUMENTS 9,591,582 B1 * 3/2017 Rabii .................... H04L 43/028
10,098,166 B2 * 10/2018 Liang ................ H04W 72/0453
(Continued)

FOREIGN PATENT DOCUMENTS

CN 104050742 A 9/2014
CN 105072012 A 11/2015
(Continued)

*Primary Examiner* — Marceau Milord
(74) *Attorney, Agent, or Firm* — Slater Matsil, LLP

(57) ABSTRACT

A terminal receives an input operation of adding a new device to a target account by a user. The terminal obtains device information of a to-be-added first device in response to the input operation, where the device information includes a MAC address of the first device. The terminal establishes a P2P connection to the first device based on the device information. After the terminal successfully establishes the P2P connection to the first device, the terminal displays the first device as an online device of the target account. The terminal receives a control operation entered by the user on the first device. The terminal sends a control instruction to the first device through the P2P connection in response to the control operation.

18 Claims, 9 Drawing Sheets

(51) Int. Cl.
     *H04L 67/104*   (2022.01)
     *H04W 12/06*    (2021.01)
     *H04W 12/73*    (2021.01)
     *H04W 76/14*    (2018.01)
     *H04W 84/12*    (2009.01)
(52) U.S. Cl.
     CPC ........... *H04W 12/06* (2013.01); *H04W 12/73* (2021.01); *H04W 84/12* (2013.01)
(58) Field of Classification Search
     USPC ........................................................ 370/338
     See application file for complete search history.

(56) References Cited

U.S. PATENT DOCUMENTS

| | | | | |
|---|---|---|---|---|
| 2013/0316682 | A1* | 11/2013 | Vieira | H04L 51/04 455/414.1 |
| 2014/0056209 | A1* | 2/2014 | Park | H04W 16/26 370/315 |
| 2015/0100166 | A1 | 4/2015 | Baynes et al. | |
| 2015/0312945 | A1 | 10/2015 | Park et al. | |
| 2016/0112262 | A1* | 4/2016 | Johnson | G06F 9/4411 709/221 |
| 2016/0182624 | A1* | 6/2016 | Liang | H04L 12/12 709/228 |
| 2017/0127276 | A1 | 5/2017 | Koo et al. | |
| 2017/0188397 | A1* | 6/2017 | Liang | H04W 24/08 |
| 2017/0245276 | A1* | 8/2017 | Kim | H04W 76/14 |
| 2018/0048621 | A1* | 2/2018 | Yiu | H04L 65/1069 |
| 2018/0262388 | A1* | 9/2018 | Johnson | H04L 63/0823 |

FOREIGN PATENT DOCUMENTS

| | | |
|---|---|---|
| CN | 105306319 A | 2/2016 |
| CN | 105392163 A | 3/2016 |
| CN | 105546931 A | 5/2016 |
| CN | 105553931 A | 5/2016 |
| CN | 105589419 A | 5/2016 |
| CN | 105703985 A | 6/2016 |
| CN | 106031085 A | 10/2016 |
| CN | 106603807 A | 4/2017 |
| CN | 107249174 A | 10/2017 |
| CN | 107682238 A | 2/2018 |
| CN | 107786663 A | 3/2018 |
| CN | 109362119 A | 2/2019 |
| CN | 109905318 A | 6/2019 |
| CN | 109981747 A | 7/2019 |
| CN | 110519131 A | 11/2019 |
| EP | 2654331 A1 | 10/2013 |
| EP | 3319300 A1 | 5/2018 |
| WO | 2018113086 A1 | 6/2018 |
| WO | 2019134595 A1 | 7/2019 |

* cited by examiner ial Application No. PCT/CN2020/103126, filed on Jul. 20, 2020,
DEVICE CONTROL METHOD AND TERMINAL

CROSS-REFERENCE TO RELATED APPLICATIONS

This application is a national stage of International Application No. PCT/CN2020/103126, filed on Jul. 20, 2020, which claims priority to Chinese Patent Application No. 201910682532.0, filed on Jul. 26, 2019. Both of the aforementioned applications are hereby incorporated by reference in their entireties.

TECHNICAL FIELD

This application relates to the field of terminal technologies, and in particular, to a device control method and a terminal.

BACKGROUND

With development of smart home technologies, a user or home usually has a plurality of smart home devices, for example, a smart television, a smart speaker, and an air purifier. These smart home devices may communicate with each other through Wi-Fi, Bluetooth, or the like.

A Wi-Fi connection is used as an example. A user may set a router in a home as an access point (access point, AP), to provide a signal source of a Wi-Fi network. Further, the user may use one or more smart home devices in the home as stations (stations, STAs) to access the router, to join the Wi-Fi network provided by the router. In this way, all stations in the Wi-Fi network may communicate with each other through the Wi-Fi network.

Usually, the user may use a mobile phone to add a newly purchased smart home device to the foregoing Wi-Fi network and control the smart home device. A smart speaker is used as an example. When using the smart speaker for the first time, the user can enable a Wi-Fi function of the smart speaker and find the smart speaker by using the mobile phone. Because the mobile phone has obtained a name and a password of the Wi-Fi network when joining the Wi-Fi network, after finding the smart speaker, the mobile phone may send the name and the password of the Wi-Fi network to the smart speaker. In this way, the smart speaker can join the corresponding Wi-Fi network based on the name and the password sent by the mobile phone. Further, the smart speaker may log in to a server in a smart home system through the Wi-Fi network. After successfully logging in to the server, the smart speaker may send, to the mobile phone, a response message indicating that the device has successfully logged in to the server, and the mobile phone may further display, to the user, the message indicating that the smart speaker has successfully logged in to the server. Subsequently, the user can control the smart speaker on the mobile phone.

It can be learned that three phases need to be performed to add a new smart home device to a mobile phone. A first phase is a phase in which a name and a password for joining a Wi-Fi network need to be first obtained by using the mobile phone, a second phase is a network access phase of joining the Wi-Fi network, and a third phase is a phase of logging in to a server to perform device registration. Consequently, time required for an entire device addition process is long, and user experience is poor.

SUMMARY

This application provides a device control method and a terminal, so that a newly added smart home device can be quickly added to the terminal, to quickly implement a control function of the terminal on the smart home device, and improve user experience.

To achieve the foregoing objective, the following technical solutions are used in this application.

According to a first aspect, this application provides a device control method, including: A terminal receives an input operation of adding a new device to a target account by a user. The terminal may obtain device information of a to-be-added first device in response to the input operation, where the device information includes a MAC address of the first device. The terminal may further establish a P2P connection to the first device based on the device information of the first device. After the terminal successfully establishes the P2P connection to the first device, the terminal may display the first device as an online device of the target account. Subsequently, the terminal may receive a control operation entered by the user on the first device. The terminal may send a control instruction to the first device through the P2P connection in response to the control operation, to implement a control function of the terminal on a smart home device.

In other words, after the terminal establishes a P2P connection to a newly added smart home device (that is, the first device), the terminal may display the first device as the online device, and deliver the control instruction to the first device based on the P2P connection. Because the user can successfully add and control the smart home device in the terminal without waiting for the smart home device to access an access point and complete device registration in a server, for the user, time consumption in a process of discovering and adding the smart home device in the terminal is significantly reduced, so that the user can quickly add the newly added smart home device to the terminal, quickly implement a control function of a mobile phone on the smart home device, and improve user experience.

In a possible implementation, that the terminal obtains device information of a to-be-added first device includes: The terminal scans a two-dimensional code in the first device; and the terminal obtains the device information of the first device from the two-dimensional code. Certainly, the terminal may alternatively obtain the device information of the first device in another manner such as NFC. This is not limited in this application.

In a possible implementation, that the terminal establishes a P2P connection to the first device based on the device information includes: The terminal negotiates, based on the device information, with the first device about a Wi-Fi proprietary protocol used for establishing the P2P connection this time; and further, the terminal establishes a P2P Wi-Fi connection to the first device according to the negotiated Wi-Fi proprietary protocol.

In a possible implementation, before the terminal establishes a P2P Wi-Fi connection to the first device according to the negotiated Wi-Fi proprietary protocol, the method further includes: The terminal negotiates, based on the device information, with the first device about a key used for establishing the P2P connection this time.

For example, in addition to the MAC address of the first device, the device information may further include a PSK of the first device and a channel used by the first device.

That the terminal negotiates, based on the device information, with the first device about a Wi-Fi proprietary protocol used for establishing the P2P connection this time specifically includes: The terminal sends a first probe request frame to the first device based on the MAC address of the first device and the channel used by the first device, where the first probe request frame includes a negotiation request, and the negotiation request is used to negotiate with the first device about the Wi-Fi proprietary protocol used for establishing the P2P connection this time; further, the terminal may receive a first probe response frame sent by the first device, where the first probe response frame includes an identifier that is of the Wi-Fi proprietary protocol and that is determined by the first device; and the terminal may determine, based on the identifier of the Wi-Fi proprietary protocol, the Wi-Fi proprietary protocol used for establishing the P2P connection this time.

That the terminal negotiates, based on the device information, with the first device about a key used for establishing the P2P connection this time includes: The terminal sends a second probe request frame to the first device based on the MAC address of the first device and the channel used by the first device, where the second probe request frame includes a first character string; further, the terminal may receive a second probe response frame sent by the first device, where the second probe response frame includes a second character string obtained after the first device encrypts the first character string; and the terminal decrypts the second character string based on the PSK, and if a decrypted second character string is the same as the first character string, the terminal determines the PSK as the key used for establishing the P2P connection this time.

In a possible implementation, after the terminal establishes a P2P connection to the first device based on the device information, the method further includes: The terminal sends, to the first device through the P2P connection, an SSID and a password of a Wi-Fi network that is accessed by the terminal, so that the first device accesses the Wi-Fi network by using the SSID and the password. In other words, the terminal may control the first device through the P2P connection, and may help the first device access the Wi-Fi network.

In a possible implementation, after the first device accesses the Wi-Fi network by using the SSID and the password, the method further includes: The terminal sends a registration request to a server, where the registration request is used to request the server to register the first device as a registration device of the target account; and the terminal receives registration information sent by the server, and sends the registration information to the first device, so that the first device registers with the server as the registration device of the target account by using the registration information. In other words, after helping the first device access the Wi-Fi network, the terminal may help the first device complete a registration process in the server.

In a possible implementation, after the first device accesses the Wi-Fi network by using the SSID and the password, the method further includes: The terminal may break the P2P connection to the first device. Certainly, the terminal may continue to interact with the first device through the P2P connection.

In a possible implementation, after the first device accesses the Wi-Fi network by using the SSID and the password, the method further includes: If the P2P connection between the terminal and the first device is not broken, the terminal interacts with the first device through the P2P connection. In other words, the terminal may preferably use the P2P connection to interact with the first device by default, to improve a transmission speed when the terminal interacts with the first device.

In a possible implementation, the first device may be one or more of a smart television, a smart air conditioner, a smart refrigerator, a smart speaker, a smart light, or a smart curtain.

According to a second aspect, this application provides a device control method, including: A first device establishes a P2P connection to a terminal before accessing a network; the first device receives, through the P2P connection, a control instruction sent by the terminal; and the first device executes the control instruction. In other words, when using the smart home device for the first time, a user does not need to wait for the smart home device to be connected to a network, or wait for the smart home device to complete device registration in the server, and the terminal may interact with the smart home device in a manner of establishing a P2P connection to the smart home device. In this way, after establishing the P2P connection to the newly added smart home device, the terminal may display the device as an online device, so that the user may quickly add the newly added smart home device to a mobile phone, and control the smart home device by using the mobile phone.

In a possible implementation, after a first device establishes a P2P connection to a terminal before accessing a network, the method further includes: The first device obtains an SSID and a password of a Wi-Fi network from the first device through the P2P connection; and the first device accesses the Wi-Fi network by using the SSID and the password.

In a possible implementation, after a first device establishes a P2P connection to a terminal before accessing a network, the method further includes: The first device receives, through a first Wi-Fi channel in a time division multiplexing manner, the control instruction sent by the terminal, and accesses the Wi-Fi network by using the SSID and the password through a second Wi-Fi channel, where the first Wi-Fi channel is used to support the P2P connection between the first device and the terminal, and the second Wi-Fi channel is used to support interaction between the first device and an access point in the Wi-Fi network. In this way, the first device may further interact with the access point while interacting with the terminal.

In a possible implementation, a first device establishes a P2P connection to a terminal before accessing a network includes: The first device negotiates with the terminal about a Wi-Fi proprietary protocol used for establishing the P2P connection this time; the first device negotiates with the terminal about a key used for establishing the P2P connection this time; and the first device establishes the P2P connection to the terminal according to the negotiated Wi-Fi proprietary protocol and the key.

In a possible implementation, after the first device accesses the Wi-Fi network by using the SSID and the password, the method further includes: The first device obtains registration information sent by the terminal; and the first device registers with a server through the Wi-Fi network as a registration device of a target account by using the registration information.

According to a third aspect, this application provides a terminal, including a touchscreen, a communications module, one or more processors, one or more memories, and one or more computer programs. The processor is coupled to the touchscreen, the communications module, and the memory. The one or more computer programs are stored in the memory. When the terminal runs, the processor executes the one or more computer programs stored in the memory, and the terminal is enabled to perform the device control method according to any one of the foregoing aspects.

According to a fourth aspect, this application provides a smart home device, including a communications module, one or more processors, one or more memories, and one or more computer programs. The processor is coupled to both the communications module and the memory. The one or more computer programs are stored in the memory. When the smart home device runs, the processor executes the one or more computer programs stored in the memory, and the smart home device is enabled to perform the device control method described in any one of the foregoing aspects.

According to a fifth aspect, this application provides a computer storage medium, including computer instructions. When the computer instructions are run on a terminal, the terminal is enabled to perform the device control method according to any implementation of the first aspect.

According to a sixth aspect, this application provides a computer storage medium, including computer instructions. When the computer instructions are run on a smart home device, the smart home device is enabled to perform the device control method according to any implementation of the second aspect.

According to a seventh aspect, this application provides a computer program product. When the computer program product runs on a terminal, the terminal is enabled to perform the device control method according to any implementation of the first aspect.

According to an eighth aspect, this application provides a computer program product. When the computer program product runs on a smart home device, the smart home device is enabled to perform the device control method according to any implementation of the first aspect.

According to a ninth aspect, this application provides a smart home system, including the terminal according to any one of the foregoing aspects and the smart home device according to any one of the foregoing aspects. Optionally, the smart home system may further include an access point configured to provide a Wi-Fi network.

It may be understood that the terminal, the smart home device, the computer storage medium, the computer program product, and the smart home system provided above are all configured to perform the corresponding method provided above. Therefore, for beneficial effects that can be achieved by the terminal, the smart home device, the computer storage medium, the computer program product, and the smart home system, refer to beneficial effects in the corresponding method provided above. Details are not described herein again.

DETAILED DESCRIPTION OF ILLUSTRATIVE EMBODIMENTS

The following describes implementations of the embodiments of this application in detail with reference to the accompanying drawings.

Figure 1:
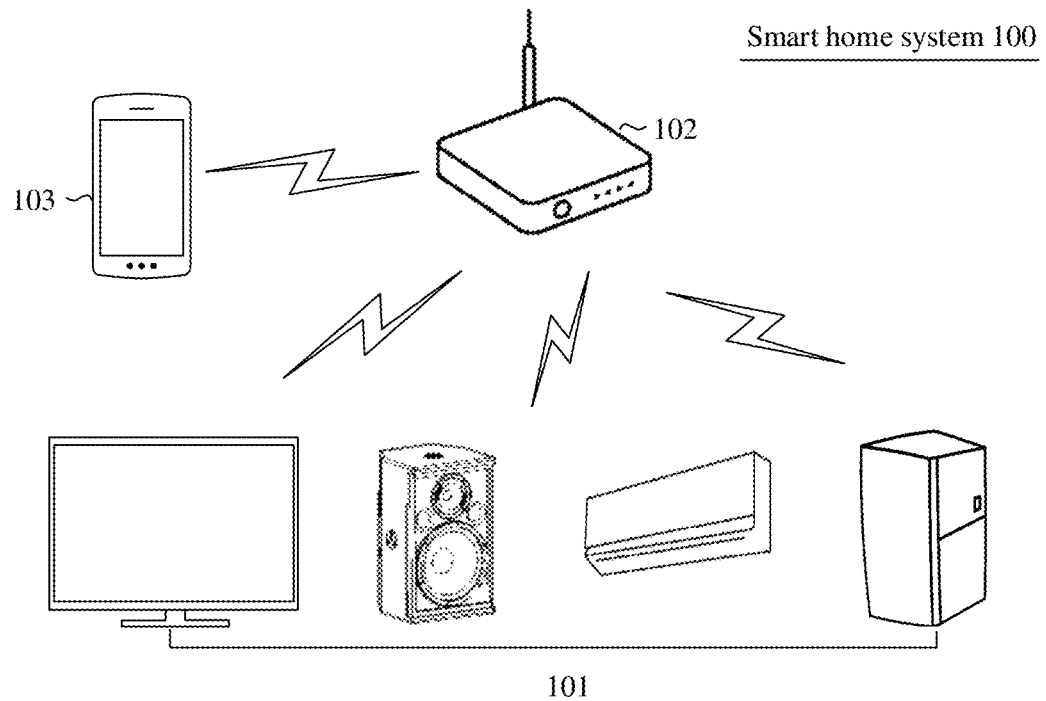
FIG. 1 is a schematic diagram of an architecture of a smart home system according to an embodiment of this application.

A device control method provided in the embodiments of this application may be applied to a smart home system. As shown in FIG. 1, the smart home system 100 may include one or more smart home devices 101. For example, the smart home device 101 may be an IoT (internet of things, internet of things) device such as a smart television, a smart air conditioner, a smart refrigerator, a smart speaker, a smart light, or a smart curtain.

Still as shown in FIG. 1, the smart home system 100 may further include an access point (access point, AP) 102. The access point 102 may be configured to provide a signal source of a Wi-Fi (wireless fidelity, wireless fidelity) network. For example, the access point 102 may be a router. Alternatively, the access point 102 may be a smart home device 101.

After accessing the same access point 102, the one or more smart home devices 101 join the Wi-Fi network created by the access point 102. Further, the smart home device 101 may communicate with a server on a network side by using the access point 102 through the Wi-Fi network. In addition, smart home devices 101 located in a same Wi-Fi network may also communicate with each other by using the access point 102.

Still as shown in FIG. 1, the smart home system 100 may further include a terminal 103 configured to control the smart home device 101. For example, the terminal 103 may be a mobile phone, a tablet computer, or a notebook computer. For example, the mobile phone is the terminal 103. The mobile phone may also access the access point 102, to join the Wi-Fi network in which the smart home device 101 is located. Further, a user may send a corresponding control instruction to each smart home device 101 by using the mobile phone.

For example, the user may install a smart home APP on the mobile phone, and the smart home APP may be used to manage a smart home device 101 that log in to a same Wi-Fi network under a same account. An example in which the user turns on a smart air conditioner in a home by using the smart home APP is used. When the mobile phone and each smart home device 101 are located in the same Wi-Fi network, the mobile phone may display, on the smart home APP, one or more smart home devices 101 that log in to a same account (for example, a Huawei account) in the Wi-Fi network. The smart home devices 101 are current online devices of the account.

Further, the user may select an online device such as the smart air conditioner, and select, from a management option of the smart air conditioner, a control function that needs to be performed on the smart air conditioner. For example, a control function such as turning on, off, switching modes, or adjusting temperature. If it is detected that the user taps a turn-on button for the smart air conditioner in the smart home APP, the mobile phone may send, to the access point 102 through a current Wi-Fi network, an instruction for turning on the smart air conditioner. Further, the access point 102 may send the turn-on instruction to the smart air conditioner, so that the smart air conditioner starts to work in response to the turn-on instruction.

If the user wants to use the smart home APP to control a new smart home device, the user needs to first add the smart home device to the smart home APP. Usually, when a new smart home device is added, the smart home device needs to be first connected to a same Wi-Fi network in which the mobile phone is located. Further, the Wi-Fi network is used to register, in a server of the smart home APP, the device as a smart home device under an account bound to the mobile phone.

Figure 2:
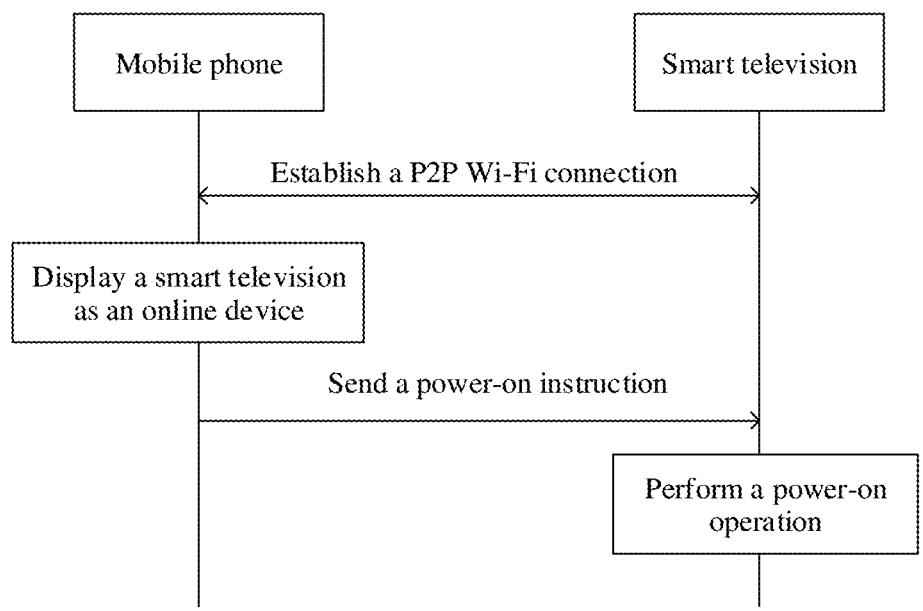
FIG. 2 is a schematic diagram 1 of interaction of a device control method according to an embodiment of this application.

However, in this embodiment of this application, when a new smart home device is added to the smart home APP, the mobile phone may quickly discover and add the device by establishing a P2P (peer-to-peer) connection to the new smart home device. For example, the smart television is used as a new smart home device. As shown in FIG. 2, the mobile phone may establish a P2P Wi-Fi connection to the smart television by using a preset proprietary Wi-Fi protocol. After the Wi-Fi connection is established, the mobile phone can display the smart television as an online device in the smart home APP.

In this case, the newly added smart television has not yet accessed the Wi-Fi network in which the access point 102 is located, and has not been registered with the server of the smart home APP. However, based on the P2P Wi-Fi connection between the mobile phone and the smart television, as still shown in FIG. 2, the user may send a corresponding control instruction to the smart television in the smart home APP of the mobile phone, for example, the user may tap a turn-on button of the smart television. Further, the mobile phone may send a corresponding control instruction (for example, a turn-on instruction) to the smart television through the P2P Wi-Fi connection, and the smart television may automatically perform a turn-on operation in response to a received turn-on instruction, to implement a control function of the user on the smart home device by using the mobile phone.

In other words, after the mobile phone establishes the P2P connection to the newly added smart home device, the mobile phone may display the device as the online device, and does not need to wait for the smart home device to access the access point and complete device registration in the server, and then display the device as the online device. After establishing the P2P connection, the mobile phone may directly perform a corresponding control function on the newly added smart home device based on the P2P connection, and a control function of the mobile phone on the smart home device does not need to be implemented in an access point routing manner.

It can be learned that the user can successfully add and control the smart home device in the mobile phone without waiting for the smart home device to access the access point and complete device registration in the server. Therefore, for the user, time consumption in a process of discovering and adding the smart home device in the mobile phone is significantly reduced, so that the user can quickly add the newly added smart home device to the mobile phone, quickly implement a control function of a mobile phone on the smart home device, and improve user experience.

In addition, after displaying the smart television as the online device in the smart home APP, the mobile phone may not only send a corresponding control instruction to the smart television, but also send, to the smart television, an SSID (service set identifier, service set identifier) and a password of the Wi-Fi network that is accessed by the mobile phone. In this way, the smart television can access, by using the SSID and the password, the Wi-Fi network in which the mobile phone is located. Subsequently, the smart television can complete device registration in the server of the smart home APP through the Wi-Fi network.

It should be noted that the user is unaware of a process in which the mobile phone sends the SSID and the password to the newly added smart television, and a process in which the smart television joins the Wi-Fi network and performs device registration. For the user, after the mobile phone establishes the P2P connection to the smart television, a status of the smart television presented by the mobile phone to the user is an available state, and the user may directly control the smart television by using the P2P connection in the mobile phone. In this way, a speed of adding the smart home device to the mobile phone is improved, and fast control of the smart home device by the mobile phone is implemented.

For example, the terminal 103 in the smart home system 100 may be specifically a mobile phone.

Figure 3:
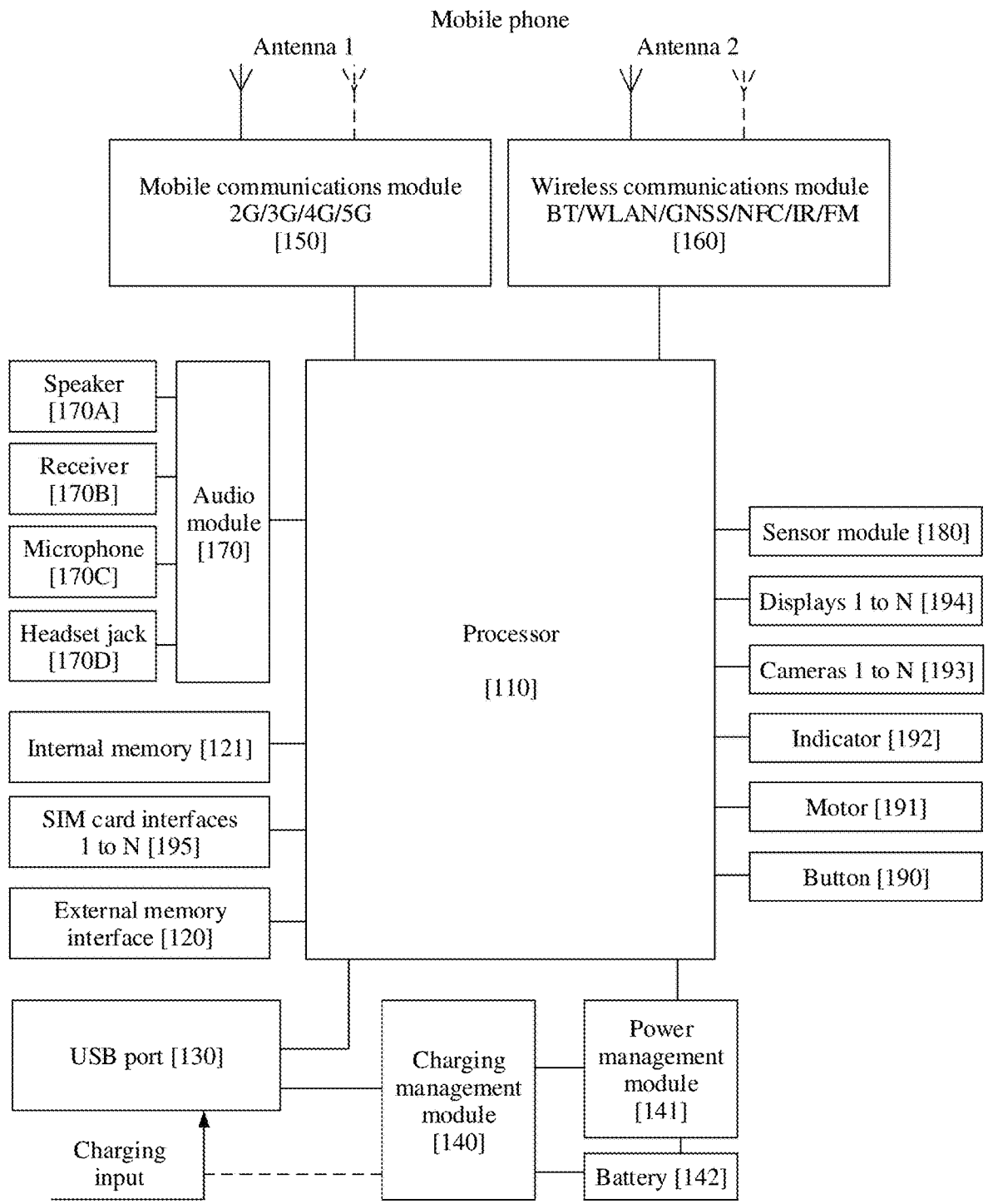
FIG. 3 is a schematic diagram 1 of a structure of a terminal according to an embodiment of this application.

As shown in FIG. 3, the mobile phone may include a processor no, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a camera 193, a display 194, and the like.

It may be understood that the structure shown in this embodiment of the present invention does not constitute a specific limitation on the mobile phone. In some other embodiments of this application, the mobile phone may include more or fewer components than those shown in the figure, combine some components, split some components, or have different component arrangements. The components in the figure may be implemented by using hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor no is a cache. The memory may store instructions or data just used or cyclically used by the processor 110. If the processor no needs to use the instructions or the data again, the processor no may directly invoke the instructions or the data from the memory. This avoids repeated access and reduces waiting time of the processor 110, thereby improving system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive wireless charging input by using a wireless charging coil of the mobile phone. The charging management module 140 supplies power to the mobile phone by using the power management module 141 while charging the battery 142.

The power management module 141 is configured to connect the battery 142 and the charging management module 140 to the processor 110. The power management module 141 may receive an input of the battery 142 and/or an input of the charging management module 140, and supply power to the processor 110, the internal memory 121, the display 194, the camera 193, the wireless communications module 160, and the like.

The power management module 141 may be configured to monitor performance parameters such as a battery capacity, a battery cycle count, battery charging voltage, battery discharging voltage, and a battery state of health (for example, current leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the mobile phone. The mobile communications module 150 may include one or more filters, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor no. In some embodiments, at least some functional modules of the mobile communications module 150 and at least some modules of the processor no may be disposed in a same device.

The communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the mobile phone. The wireless communications module 160 may be one or more components integrating one or more communications processor modules. The wireless communications module 160 receives an electromagnetic wave through the antenna 2, performs frequency modulation and filtering processing on an electromagnetic wave signal, and sends a processed signal to the processor no. The wireless communications module 160 may further receive a to-be-sent signal from the processor no, perform frequency modulation and amplification on the signal, and by using the antenna 2, convert the signal into an electromagnetic wave and radiate the electromagnetic wave.

In some embodiments, the antenna 1 and the mobile communications module 150 of the mobile phone are coupled, and the antenna 2 and the wireless communications module 160 of the mobile phone are coupled, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The mobile phone implements a display function by using the GPU, the display 194, the application processor, and the like. The GPU is a microprocessor for image processing, and is connected to the display 194 and the application processor. The GPU is configured to perform mathematical and geometric calculation, and render an image. The processor no may include one or more GPUs that execute program instructions to generate or change display information.

The display 194 is configured to display an image, a video, and the like. The display 194 includes a display panel.

The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diodes, QLED), or the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. In some embodiments, the mobile phone 100 may include one or N cameras, where N is a positive integer greater than 1. The camera 193 may be a front-facing camera or a rear-facing camera.

The digital signal processor is configured to process a digital signal, and may further process another digital signal in addition to a digital image signal. For example, when the mobile phone selects a frequency, the digital signal processor is configured to perform Fourier transform on frequency energy, and the like.

The video codec is configured to compress or decompress a digital video. The mobile phone may support one or more video codecs. In this way, the mobile phone can play or record videos in a plurality of coding formats, for example, moving picture experts group (moving picture experts group, MPEG)-1, MPEG-2, MPEG-3, and MPEG-4.

The external memory interface 120 may be configured to connect to an external storage card such as a micro SD card, to extend a storage capability of the mobile phone. The external memory card communicates with the processor no through the external memory interface 120, to implement a data storage function. For example, files such as music and a video are stored in the external storage card.

The internal memory 121 may be configured to store one or more computer programs, and the one or more computer programs include instructions. The processor no may run the instructions stored in the internal memory 121, so that the mobile phone performs a method for intelligently recommending a contact provided in some embodiments of this application, various functional applications, data processing, and the like. The internal memory 121 may include a program storage area and a data storage area. The program storage region may store an operating system. The program storage region may further store one or more application programs (for example, a gallery or a contact) and the like. The data storage area may store data (such as photos and contacts) created during use of the mobile phone. In addition, the internal memory 121 may include a high-speed random access memory, and may further include a nonvolatile memory, for example, one or more magnetic disk storage devices, a flash memory device, or a universal flash storage (universal flash storage, UFS). In some other embodiments, the processor no runs the instructions stored in the internal memory 121 and/or the instructions stored in the memory disposed in the processor, to enable the mobile phone to perform the methods and various functional applications and data processing provided in the embodiments of this application.

The mobile phone may implement an audio function such as music playing or recording by using the audio module 170, the speaker 170A, the receiver 170B, the microphone 170C, the headset interface 170D, the application processor, and the like.

The audio module 170 is configured to convert digital audio information into an analog audio signal output, and is further configured to convert an analog audio input into a digital audio signal. The audio module 170 may further be configured to code and decode an audio signal. In some embodiments, the audio module 170 may be disposed in the processor no, or some functional modules of the audio module 170 are disposed in the processor no.

The speaker 170A, also referred to as a "horn", is configured to convert an audio electrical signal into a sound signal. The mobile phone may listen to music by using the speaker 170A, or listen to a hands-free call.

The receiver 170B, also referred to as an "earpiece", is configured to convert an audio electrical signal into a sound signal. When a call is answered or voice information is received by using the mobile phone, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C, to enter a sound signal to the microphone 170C. The mobile phone may be provided with one or more microphones 170C. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, reduce noise, further identify a sound source, implement a directional recording function, and the like.

The headset jack 170D is configured to connect to a wired headset. The headset jack 170D may be a USB interface 130, a 3.5 mm open mobile terminal platform (open mobile terminal platform, OMTP) standard interface, or a cellular telecommunications industry association of the USA (cellular telecommunications industry association of the USA, CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. This is not limited in the embodiments of this application.

Certainly, the mobile phone provided in this embodiment of this application may further include one or more components such as a button 190, a motor 191, an indicator 192, and a SIM card interface 195. This is not limited in the embodiments of this application.

The following describes in detail a device control method provided in an embodiment of this application with reference to accompanying drawings.

Figure 4:
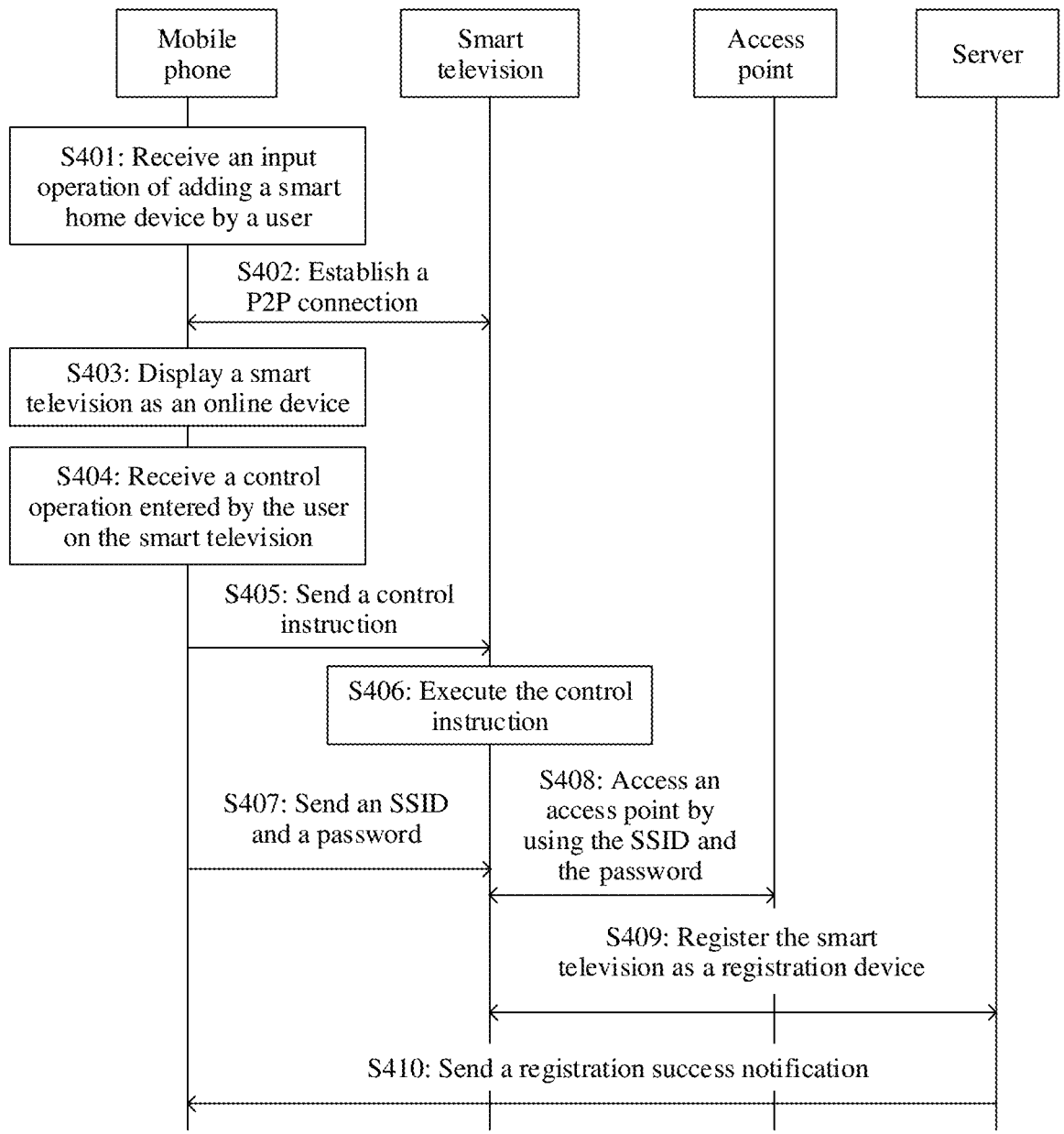
FIG. 4 is a schematic diagram 2 of interaction of a device control method according to an embodiment of this application.

As shown in FIG. 4, in an example in which a mobile phone is the terminal 103 in the smart home system 100, and a smart television is the smart home device 101 that is ready to join the smart home system 100, an embodiment of this application provides a device control method including the following steps.

S401: The mobile phone receives an input operation of adding a smart home device by a user.

For example, a smart home APP used to control each smart home device may be installed in the mobile phone. Usually, the user may register an account (subsequently referred to as a target account in the embodiment) in the smart home APP. The user can register all smart home devices to be managed with the target account. A plurality of smart home devices under a same target account may be uniformly managed by a server of the smart home APP. In this way, each smart home device in a user's home may be associated by using one target account.

Figure 5:
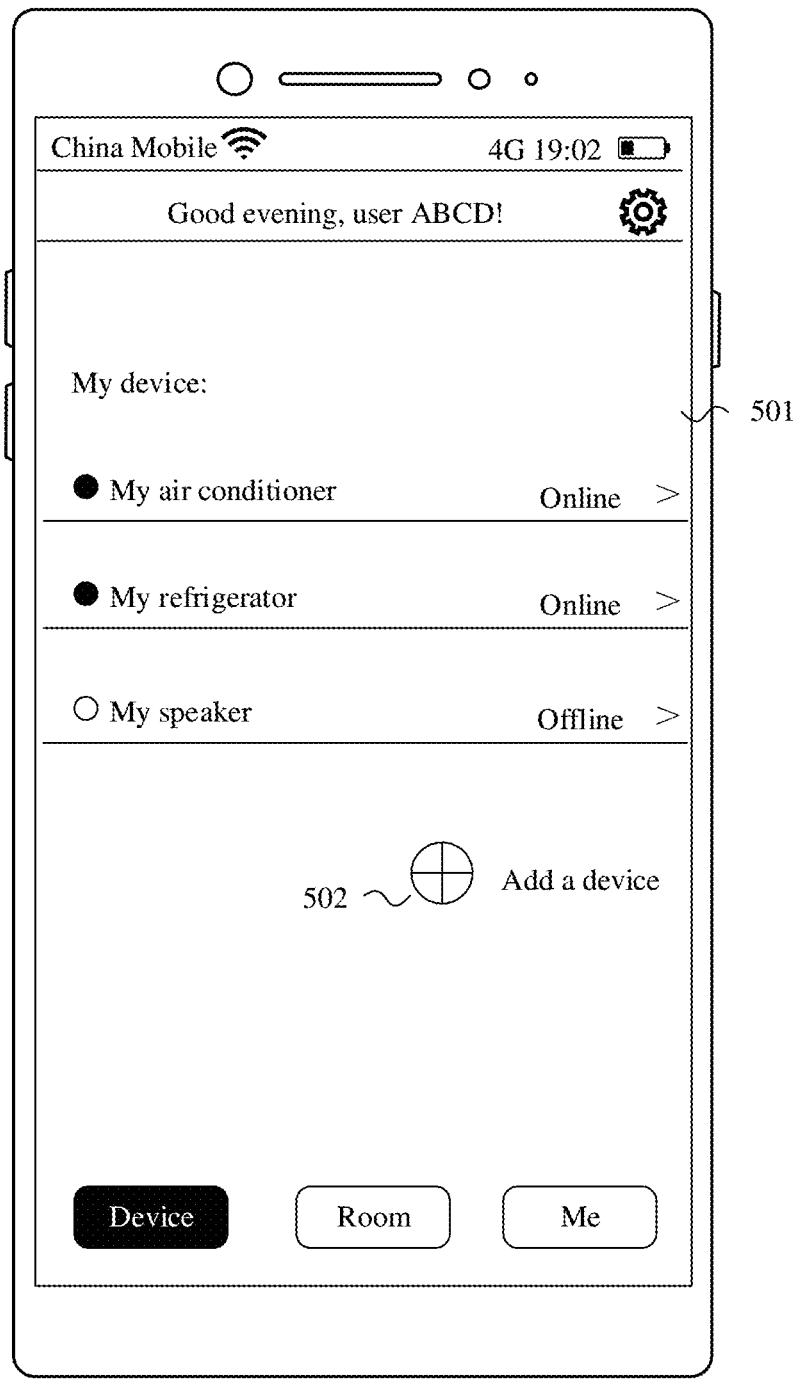
FIG. 5 is a schematic diagram 1 of an application scenario of a device control method according to an embodiment of this application.

As shown in FIG. 5, after the user opens the smart home APP in the mobile phone, the mobile phone may display a display interface 501 of the smart home APP. For example, the mobile phone may display, in the display interface 501, online devices currently registered with the target account. For example, when registering each smart home device in the smart home APP, the mobile phone may obtain an identifier of the smart home device, for example, a name, a MAC (media access control, media access control layer) address, or an IP address of the smart home device. In this case, based on the identifier of each smart home device, the mobile phone may query, in the server, whether each smart home device has been registered with the target account. For example, if an air conditioner has been registered with the server as a registration device of the target account, the mobile phone may display the air conditioner as an online device. For another example, if the speaker is not registered with the server as a registration device of the target account, the mobile phone may display the speaker as an offline device.

The user can access a management interface of one or more online devices in the smart home APP, and control a corresponding smart home device in the management interface to implement a corresponding control function. For example, the user may enter an air conditioner management interface in the smart home APP, and enable the air conditioner, adjust a temperature, or adjust a wind speed in the air conditioner management interface.

Still as shown in FIG. 5, the display interface 501 may include an adding option 502 of a new smart home device. When the user uses a new smart home device (such as a smart television) for the first time, the user needs to bind the smart television to the target account registered by the user in the smart home APP. In this way, the smart television can be displayed in the smart home APP as an online device, so that the user can control the smart television to implement various functions by using the smart home APP. In this case, if it is detected that the user taps the adding option 502, it indicates that the mobile phone receives the input operation of adding the new smart home device by the user, and further, the mobile phone may continue to perform the following step S402.

S402: The mobile phone establishes a P2P connection to the to-be-added smart television.

In this embodiment of this application, to quickly add a new smart home device to the smart home APP, so that the user can control the newly added smart home device as soon as possible by using the smart home APP, after detecting that the user taps the adding option 502, the mobile phone may obtain device information such as a MAC address of the to-be-added smart home device (for example, the smart television), to establish a P2P connection to the smart television by using the device information, without completing registration in the server after the smart television is connected to an access point, and the mobile phone can control the smart television based on the P2P connection.

Figure 6B:
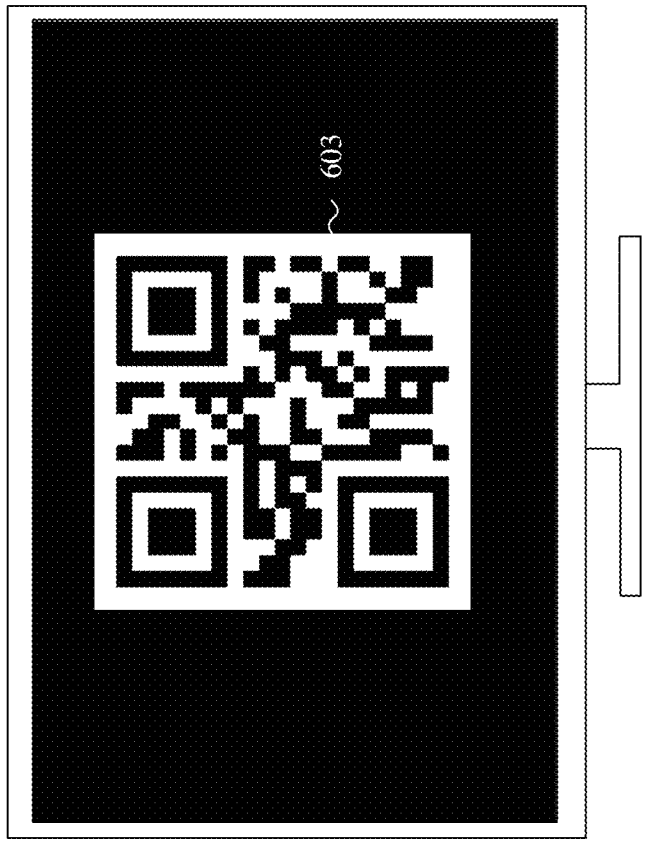
FIG. 6(a) and FIG. 6(b) are a schematic diagram 2 of an application scenario of a device control method according to an embodiment of this application.
Figure 6A:
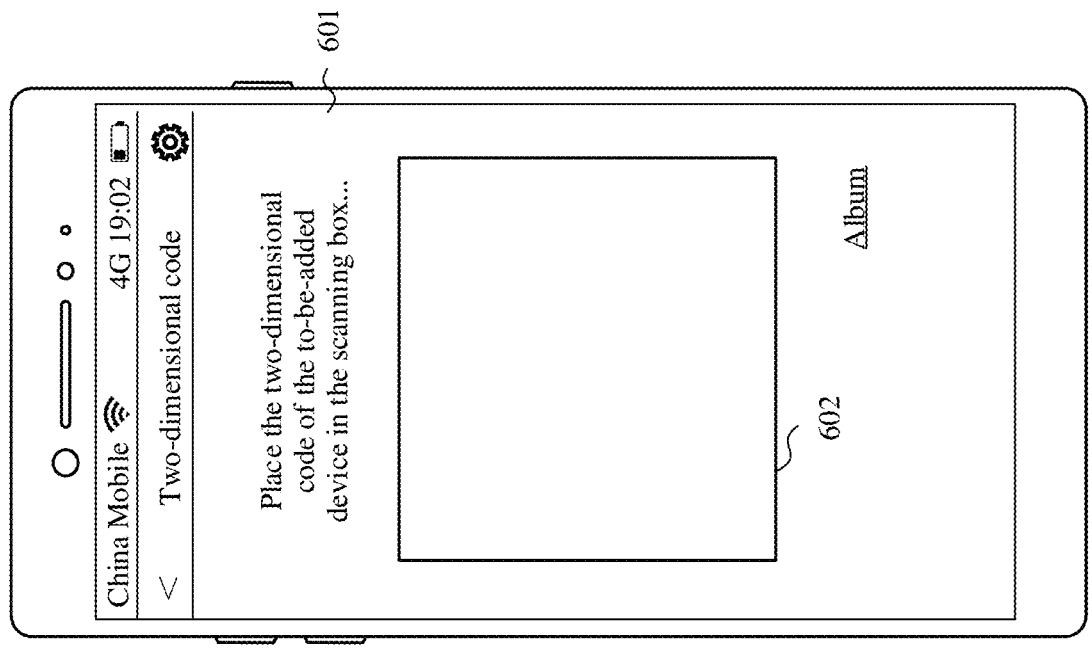

For example, after the mobile phone detects that the user taps the adding option 502, as shown in FIG. 6(a), the mobile phone may display a display interface 601. The mobile phone may prompt, in the display interface 601, the user to scan a two-dimensional code on a to-be-added smart home device. In addition, the mobile phone may turn on a camera, and display, in a scanning box 602 of the display interface 601, a picture captured by the camera, so that the mobile phone obtains the two-dimensional code in the scanning box 602 in real time.

In addition, as shown in FIG. 6(b), the smart television that needs to be added to the smart home APP this time may display a preset two-dimensional code 603. The two-dimensional code 603 may include an identifier of the smart television, for example, a MAC address of the smart television. Alternatively, in addition to the MAC address, the two-dimensional code 603 may further include one or more pieces of information such as a channel used by the smart television and a pre-shared key (pre-shared key, PSK) used by the smart television. Certainly, the two-dimensional code 603 may also be printed or pasted on a housing or package of the smart television. This is not limited in the embodiments of this application.

It should be noted that the MAC address and the channel may be a MAC address and a channel that are preset for the smart television when the smart television is delivered from the factory. In a subsequent use process, the smart television may also dynamically change the MAC address and/or the channel of the smart television. This is not limited in the embodiments of this application.

After the user scans the two-dimensional code 603 on the smart television by using the mobile phone, the mobile phone may obtain information such as the MAC address of the smart television, the channel used by the smart television, and the PSK used by the smart television. Further, the mobile phone may quickly establish the P2P connection to the smart television based on the information.

For example, after the mobile phone obtains the MAC address of the smart television and the channel used by the smart television, the mobile phone may directionally send a probe request (probe request) frame to the smart television. For example, the mobile phone may send a first probe request frame to the smart television based on the MAC address of the smart television and the channel used by the smart television. Usually, a user-defined field is set in a probe request frame. The mobile phone may use a user-defined field of the first probe request frame to carry a negotiation request, to negotiate, with the smart television, a proprietary protocol used for establishing the P2P connection this time. For example, the user-defined field of the first probe request frame may include an identifier of a preset proprietary Wi-Fi protocol. After receiving the first probe request frame, the smart television may send a first probe response (probe response) frame to the mobile phone if the smart television agrees to establish the P2P connection by using the proprietary Wi-Fi protocol.

After receiving the first probe response frame, the mobile phone may continue to send a second probe request frame to the smart television. The mobile phone may use a user-defined field of the second probe request frame to carry a key request, to negotiate with the smart television about a key used for establishing the P2P connection this time. For example, the user-defined field of the second probe request frame may include a string of random characters. After receiving the second probe request frame, the smart television may encrypt the random characters by using the PSK of the smart television, use the second probe response frame to carry encrypted data, and send the second probe response frame to the mobile phone. After receiving the second probe response frame, the mobile phone may decrypt the encrypted data in the second probe response frame by using the PSK obtained from the two-dimensional code 603. If a character string obtained through decryption is the same as the character string in the second probe request frame, current key negotiation succeeds.

After key negotiation is complete, the mobile phone can establish the P2P Wi-Fi connection with the smart television based on the negotiated proprietary Wi-Fi protocol and the key. Subsequently, when interacting with the smart television, the mobile phone may transmit, in a form of a Wi-Fi unicast data frame, to-be-sent data or a to-be-sent instruction at a link layer of the Wi-Fi connection, and does not need to interact with the smart television by using an IP protocol. In this way, even if the smart television is not connected to a network or is not registered with the server, the mobile phone may establish the P2P Wi-Fi connection to the smart television, and interact with the smart television through the P2P Wi-Fi connection.

In some embodiments, an NFC (near field communication, near field communication) chip may also be installed in the mobile phone and the smart television in advance to support an NFC function. The smart television may store information such as the MAC address of the smart television, the channel used by the smart television, and the PSK used by the smart television in the NFC chip. In this case, when the mobile phone and the smart television are close to each other, the smart television may send information such as the MAC address of the smart television, the channel used by the smart television, and the PSK used by the smart television to the mobile phone by using the NFC function, so that the mobile phone can still establish the P2P connection to the smart television according to the foregoing method. Certainly, the mobile phone may further scan a surrounding Wi-Fi device according to an existing Wi-Fi discovery process, to discover the smart television, and obtain information such as the MAC address of the smart television. This is not limited in the embodiments of this application.

In the foregoing embodiment, an example in which the mobile phone establishes the P2P Wi-Fi connection to the smart television by using the preset proprietary Wi-Fi protocol is used. It may be understood that the mobile phone may alternatively establish a P2P connection to the smart television in another manner. This is not limited in the embodiments of this application. For example, the mobile phone may establish a point-to-point Wi-Fi transmission channel with the smart television according to a Wi-Fi direct technology in a Wi-Fi standard protocol.

S403: The mobile phone displays the smart television as an online device of the target account.

Figure 7:
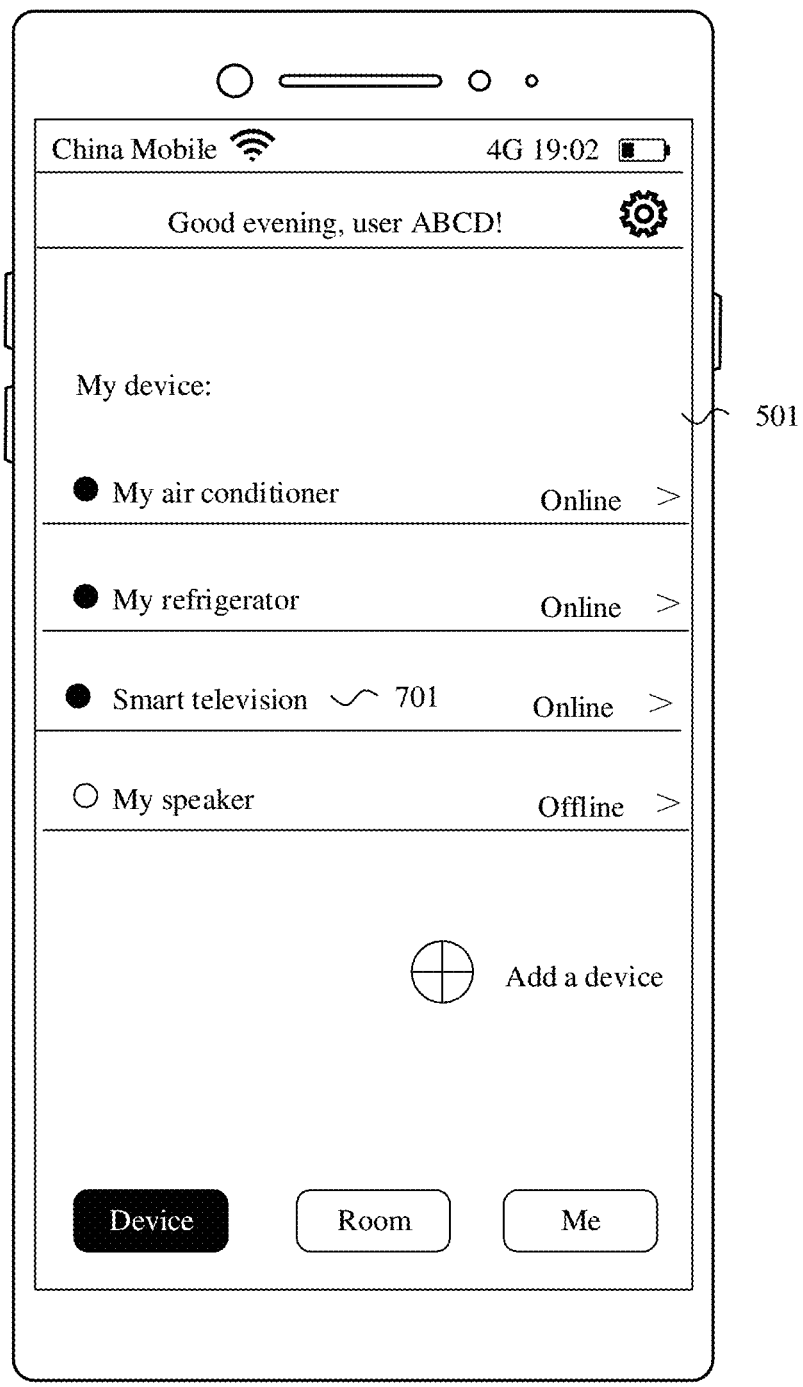
FIG. 7 is a schematic diagram 3 of an application scenario of a device control method according to an embodiment of this application.

After the P2P Wi-Fi connection is established between the mobile phone and the smart television by using the proprietary Wi-Fi protocol, data or a control instruction may be transmitted between the mobile phone and the smart television based on the Wi-Fi connection. In this case, after the P2P Wi-Fi connection between the mobile phone and the smart television is successfully established, as shown in FIG. 7, the mobile phone may display a smart television 701 as an online device in the display interface 501, that is, the smart home device such as the smart television 701 is successfully added to the mobile phone.

Figure 8:
FIG. 8 is a schematic diagram 4 of an application scenario of a device control method according to an embodiment of this application.

In this way, if it is detected that the user selects the smart television 701 in the display interface 501, as shown in FIG. 8, the mobile phone may display a management interface 801 of the smart television 701. The management interface 801 may include one or more control options for the smart television 701, and the user may control, by using these control options, the mobile phone to implement a corresponding control function for the smart television 701.

In addition, after the mobile phone establishes a P2P Wi-Fi connection to a to-be-added smart television, the mobile phone may further ask, through the established Wi-Fi connection, whether the smart television completes device registration in the server. If the smart television has not completed device registration, in addition to displaying the smart television 701 as the online device, the mobile phone may further perform the following steps S407 to S410 with the smart television in a background, so that the smart television completes a device registration process in the server.

S404: The mobile phone receives a control operation entered by the user on the smart television.

Still as shown in FIG. 8, after the mobile phone displays the management interface 801 of the smart television 701, the user may enter various control operations on the smart television in the management interface 801.

For example, if it is detected that the user taps a power button 802 in the management interface 801, it indicates that the user enters a turn-on/off operation on the smart television. For another example, if it is detected that the user taps a volume + button 803 in the management interface 801, it indicates that the user enters a volume increase control operation on the smart television.

S405: The mobile phone sends the control instruction to the smart television through the P2P connection in response to the control operation.

S406: The smart television executes a received control instruction.

For example, the user taps the power button 802 in the management interface 801, and in step S405, after detecting that the user taps the power button 802, the mobile phone may generate the control instruction (for example, a turn-on instruction) corresponding to the power button 802. Further, the mobile phone may send the turn-on instruction to the smart television through the Wi-Fi connection established with the smart television in step S402. In this case, in step S406, after receiving, through the Wi-Fi connection, the turn-on instruction sent by the mobile phone, the smart television may perform a turn-on operation in response to the turn-on instruction. In this way, after the user adds the smart television to the smart home APP, a function of controlling the smart television may be implemented by using the smart home APP, to improve use experience of the user.

Figure 9:
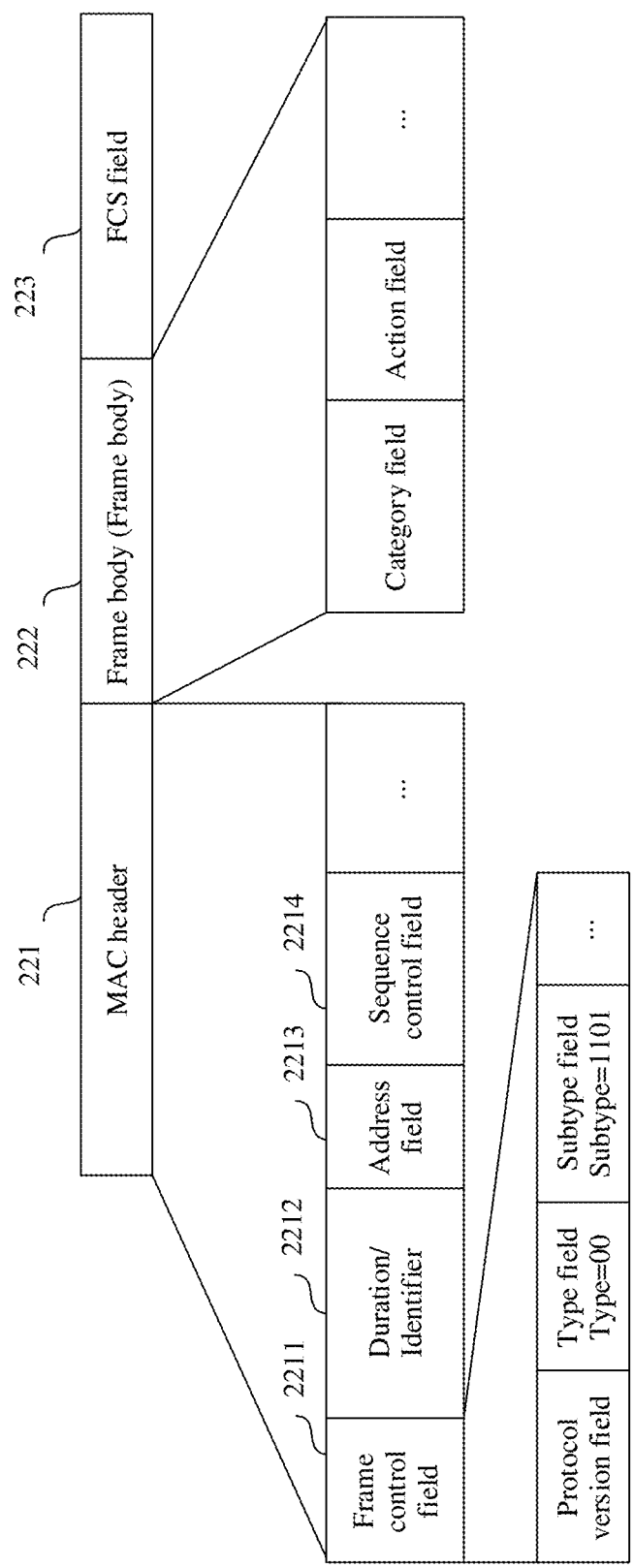
FIG. 9 is a schematic diagram of a structure of a Wi-Fi management frame according to an embodiment of this application.

For example, the control instruction sent by the mobile phone to the smart television through the P2P connection may be carried in a Wi-Fi management frame. FIG. 9 is a schematic diagram of a structure of a Wi-Fi management frame. The Wi-Fi management frame may include a frame header (that is, a MAC header) 221, a frame body (Frame Body) 222, and a frame check (Frame Check Sequence, FCS) field 223.

The MAC header 221 may include a frame control (Frame Control) field 2211, duration/ID (Duration/ID) 2212, an address (Address) field 2213, a sequence control (Sequence Control) field 2214, and the like.

The frame control field 2211 may include a protocol version (Protocol Version) field and a type field.

The protocol version field is used to indicate a protocol version with which the Wi-Fi management frame complies. For example, the protocol version field may carry an identifier of the Wi-Fi proprietary protocol negotiated by the mobile phone and the smart television in step S402.

The type field may include a type and a subtype. The type is used to indicate that a corresponding frame is a management frame, a data frame, or a control frame. The subtype is used to indicate a subtype of a frame. For example, when type=00, it may be indicated that the corresponding frame is the management frame. When subtype=1101, it may be indicated that the corresponding frame is an action frame in the management frame.

In addition, the address field 2213 may include address information such as a source address, a destination address, an address of a transmission workstation, and an address of a receiving workstation, where the destination address may be any one of a unicast address (Unicast address), a multicast address (Multicast address), and a broadcast address (Broadcast address).

Still as shown in FIG. 9, the frame body 222 of the Wi-Fi management frame includes a category field and an action field. In this embodiment of this application, the category field=127 may be set, and is used to indicate that the Wi-Fi management frame transmitted this time is a vendor-defined Wi-Fi frame. In addition, the mobile phone may use the action field to carry the control instruction that needs to be sent. The smart television may obtain, by parsing the action field in the Wi-Fi management frame, a specific control instruction sent by the mobile phone this time.

It can be learned that, when using the smart home device for the first time, a user does not need to wait for the smart home device to be connected to a network, or wait for the smart home device to complete device registration in the server, and the mobile phone may interact with the smart home device in a manner of establishing a P2P connection to a smart home device. In this way, after establishing a P2P connection to a newly added smart home device, the mobile phone may display the device as an online device, so that the user may quickly add the newly added smart home device to the mobile phone, and control the smart home device by using the mobile phone.

It should be noted that after the mobile phone establishes the P2P connection to the to-be-added smart television, that is, after the mobile phone performs step S402, the mobile phone and the smart television may further perform the following steps S407 to S410 in the background, so that the smart television accesses the access point and completes a device registration process. In other words, an execution sequence between steps S403 to S406 and steps S407 to S410 is not limited in this embodiment of this application. The mobile phone can control the smart television through the P2P connection, help the smart television access the network, and complete the device registration process.

Specifically, steps S407 to S410 include:

S407: The mobile phone sends an SSID and a password of an accessed Wi-Fi network to the smart television.

In some embodiments, to help the smart television access a Wi-Fi network in which the mobile phone is located, so that the smart television is connected to the network, when establishing the P2P connection to the smart television, the mobile phone may send, to the smart television, the SSID and the password of the Wi-Fi network to which the mobile phone accesses.

For example, in step S402, the mobile phone may obtain the MAC address of the smart television after scanning the two-dimensional code 603 shown in FIG. 6(*b*). Further, the mobile phone may send the first probe request frame to the smart television based on the MAC address of the smart television, to negotiate a proprietary protocol used when the P2P connection is established. In this case, the mobile phone may use the first probe request frame to carry the SSID and the password of the Wi-Fi network that the mobile phone currently accesses. Alternatively, when the mobile phone sends the second probe request frame to the smart television, to negotiate a key used when the P2P connection is established, the mobile phone may use the second probe request frame to carry the SSID and the password of the Wi-Fi network.

In some other embodiments, after establishing the P2P connection to the smart television, the mobile phone may send, to the smart television through the P2P connection, the SSID and the password of the Wi-Fi network currently accessed by the mobile phone. This is not limited in the embodiments of this application.

S408: The smart television accesses the access point by using the SSID and the password, to join the Wi-Fi network.

After receiving the SSID and password sent by the mobile phone, the smart television may search, according to a standard Wi-Fi protocol, a Wi-Fi network that is the same as the SSID, and log in to the Wi-Fi network by using the received password, so that the mobile phone is connected to the same Wi-Fi network as the smart television to be registered.

For example, after the mobile phone establishes the P2P connection to the smart television, the smart television not only needs to interact with the mobile phone to receive the control instruction sent by the mobile phone, but also needs to interact with the access point to access a Wi-Fi network in which the mobile phone is located. In this case, the smart television can separate a Wi-Fi function of the smart television into two Wi-Fi channels in a time division multiplexing manner. One Wi-Fi channel is used to support the P2P connection between the smart television and the mobile phone, and the other Wi-Fi channel is used to interact with the access point. For example, the smart television may perform time division multiplexing by using a preset dual band adaptive concurrent (Dual band adaptive concurrent, DBAC) algorithm. In this way, while interacting with the mobile phone, the smart television may further interact with the access point.

Similarly, after the mobile phone establishes the P2P connection to the smart television, the mobile phone may also separate a Wi-Fi function of the mobile phone into two Wi-Fi channels in a time division multiplexing manner. One Wi-Fi channel is used to support the P2P connection between the mobile phone and the smart television, and the other Wi-Fi channel is used to interact with the access point. In this way, the mobile phone may further interact with the access point while interacting with the smart television.

In addition, after receiving the SSID and the password sent by the mobile phone, the smart television may save the SSID and the password. Later, when the smart television is powered on again, the smart television can automatically join the Wi-Fi network by using the saved SSID and password.

S409: The smart television registers with the server through the Wi-Fi network as a registration device of the target account.

After joining the Wi-Fi network, the smart television may broadcast an identifier (for example, a MAC address or an IP address) of the smart television in the current Wi-Fi network, so that another device in the Wi-Fi network learns that the smart television has joined the current Wi-Fi network. Alternatively, after the smart television joins the Wi-Fi network, the access point may broadcast the identifier of the smart television in the Wi-Fi network, so that another device in the Wi-Fi network learns that the smart television has joined the current Wi-Fi network. Certainly, after the smart television joins the Wi-Fi network, the smart television may also notify, through the P2P connection, the mobile phone that the current smart television has joined the Wi-Fi network.

Because the mobile phone and the smart television access the same Wi-Fi network, after the mobile phone obtains a message that the smart television has successfully joined the current Wi-Fi network, the mobile phone may send a registration request to the server through the Wi-Fi network, where the registration request is used to apply for registration information for device registration for the smart television. For example, the registration request sent by the mobile phone may include the identifier of the smart television and a target account to which the smart home APP currently logs in, to request the server to register the smart television as a registration device of the target account. After receiving the registration request sent by the mobile phone, the server may send current registration information of the smart television to the mobile phone. The registration information may include information such as authentication information (for example, a token) and a key.

Further, the mobile phone may forward the registration information sent by the server to the smart television. The smart television may perform identity authentication with the server by using the authentication information in the registration information, and the smart television may perform key negotiation with the server by using the key in the registration information. After both the identity authentication and the key negotiation are completed, the server may register the smart television as the registration device of the target account. Subsequently, the server may centrally manage all registration devices of the target account.

It should be noted that, after the smart television joins the Wi-Fi network in which the mobile phone is located, the mobile phone may not only exchange data or instructions with the smart television through the P2P connection established in step S402, but also exchange data or instructions with the smart television in an access point routing manner. This is not limited in the embodiments of this application.

For example, after the smart television joins the Wi-Fi network in which the mobile phone is located, the mobile phone may break the established P2P connection to the smart television. Alternatively, after the smart television joins the Wi-Fi network in which the mobile phone is located, the mobile phone may continue maintaining the P2P connection to the smart television, and preferably use the P2P connection to interact with the smart television by default, to improve a transmission speed when the mobile phone interacts with the smart television. The smart television may use the time division multiplexing manner to communicate with the mobile phone through the P2P connection, and communicate with the access point through the accessed Wi-Fi network.

S410: The server sends a registration success notification to the mobile phone.

After registering the smart television as the registration device of the target account, the server may send the registration success notification to the mobile phone that sends the registration request. After receiving the registration success notification, the mobile phone may mark the smart television as the registration device. In this way, after the mobile phone subsequently opens the smart home APP again and detects that the smart television is an online device, if the mobile phone finds that the smart television has been marked as the registration device, the mobile phone does not need to perform the foregoing steps S407 to S410 to complete a device registration process of the smart television.

It can be learned that, in this embodiment of this application, for a smart home device that is used for the first time, a newly added smart home device can be quickly added to the mobile phone, to implement fast control on the smart home device by the mobile phone, and the newly added smart home device can also normally join the Wi-Fi network by using the access point and perform device registration in the server. However, the user is unaware of a process of accessing the network and registering the smart home device. After the mobile phone establishes a P2P connection with the newly added smart home device, the mobile phone may display the smart home device as an available state. In this way, the user can directly control the smart home device in the mobile phone through the P2P connection, to improve a speed of adding the smart home device to the mobile phone, and implement fast control on the smart home device by the mobile phone.

Figure 10:
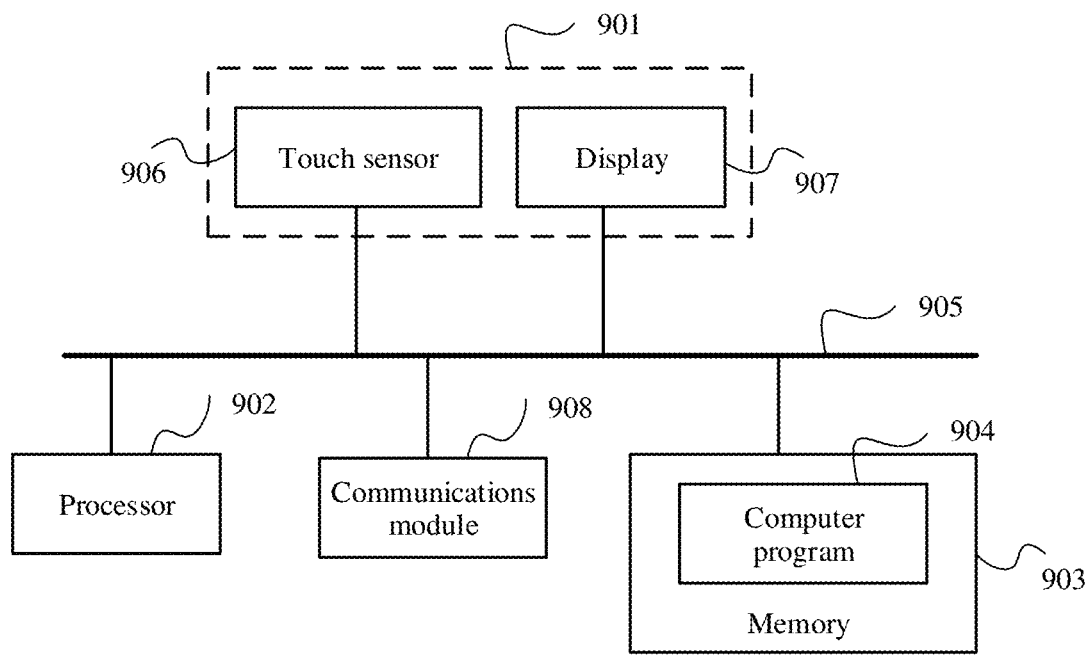
FIG. 10 is a schematic diagram 2 of a structure of a terminal according to an embodiment of this application.

As shown in FIG. 10, an embodiment of this application discloses a terminal, including a touchscreen 901 (the touchscreen 901 includes a touch sensor 906), a display 907, one or more processors 902, a memory 903, a communications module 908, and one or more computer programs 904. The foregoing components may be connected through one or more communications buses 905. The one or more computer programs 904 are stored in the memory 903 and are configured to be executed by the one or more processors 902. The one or more computer programs 904 include instructions, and the instructions may be used to perform the steps performed by the terminal in the foregoing embodiments.

For example, the processor 902 may be specifically the processor no shown in FIG. 3, the memory 903 may be specifically the internal memory 121 shown in FIG. 3, the display 907 may be specifically the display 194 shown in FIG. 3, the communications module 908 may be specifically the mobile communications module 150 and/or the wireless communications module 160 shown in FIG. 3, and the touch sensor 906 may be specifically the touch sensor in the sensor module 180 shown in FIG. 3. This is not limited in the embodiments of this application.

Figure 11:
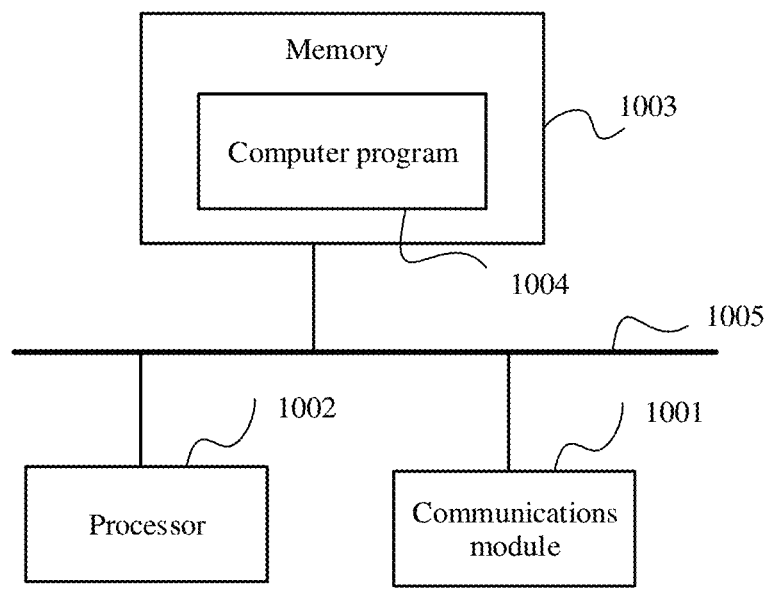
FIG. 11 is a schematic diagram of a structure of a smart home device according to an embodiment of this application.

As shown in FIG. 11, an embodiment of this application discloses a smart home device, including one or more processors 1002, a memory 1003, a communications module 1001, and one or more computer programs 1004. The foregoing components may be connected through one or more communications buses 1005. The one or more computer programs 1004 are stored in the memory 1003 and are configured to be executed by the one or more processors 1002. The one or more computer programs 1004 include instructions, and the instructions may be used to perform the steps performed by the smart home device in the foregoing embodiments.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For detailed working processes of the foregoing system, apparatus, and unit, refer to corresponding processes in the foregoing method embodiments. Details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments in this application, but are not intended to limit the protection scope of the embodiments in this application. Any variation or replacement within the technical scope disclosed in the embodiments in this application shall fall within the protection scope of the embodiments in this application. Therefore, the protection scope of the embodiments of this application shall be subject to the protection scope of the claims.

What is claimed is:

1. A method, comprising:
   receiving, by a terminal, an input operation of beginning a process of adding a new device to a target account by a user;
   obtaining, by the terminal, device information of a to-be-added first device in response to the input operation, wherein the device information comprises a media access control (MAC) address of the first device;
   establishing, by the terminal, a peer-to-peer (P2P) connection to the first device based on the device information;
   after the terminal successfully establishes the P2P connection to the first device, displaying, by the terminal, the first device as an online device of the target account;
   receiving, by the terminal, a control operation entered by the user on the first device; and
   sending, by the terminal, a control instruction to the first device through the P2P connection in response to the control operation.

2. The method according to claim 1, wherein obtaining, by the terminal, the device information of the to-be-added first device comprises:
   scanning, by the terminal, a two-dimensional code of the first device; and
   obtaining, by the terminal, the device information of the first device from the two-dimensional code.

3. The method according to claim 1, wherein establishing, by the terminal, the P2P connection to the first device based on the device information comprises:
   negotiating, by the terminal based on the device information, with the first device about a wireless fidelity (Wi-Fi) protocol used for establishing the P2P connection corresponding to the input operation; and
   establishing, by the terminal, a P2P Wi-Fi connection to the first device according to the negotiated Wi-Fi protocol.

4. The method according to claim 3, further comprising:
   before establishing, by the terminal, the P2P Wi-Fi connection to the first device according to the negotiated Wi-Fi protocol, negotiating, by the terminal based on the device information, with the first device about a key used for establishing the P2P connection corresponding to the input operation.

5. The method according to claim 4, wherein the device information further comprises a pre-shared key (PSK) of the first device and a channel used by the first device; and
   wherein negotiating, by the terminal, based on the device information, with the first device about the Wi-Fi protocol used for establishing the P2P connection corresponding to the input operation comprises:
      sending, by the terminal, a first probe request frame to the first device based on the MAC address of the first device and the channel used by the first device, wherein the first probe request frame comprises a negotiation request, and the negotiation request negotiates with the first device about the Wi-Fi protocol used for establishing the P2P connection corresponding to the input operation;
      receiving, by the terminal, a first probe response frame sent by the first device, wherein the first probe response frame comprises an identifier that is of the Wi-Fi protocol and that is determined by the first device; and
      determining, by the terminal based on the identifier of the Wi-Fi protocol, the Wi-Fi protocol used for establishing the P2P connection corresponding to the input operation; and
   wherein negotiating, by the terminal based on the device information, with the first device about the key used for establishing the P2P connection corresponding to the input operation comprises:
      sending, by the terminal, a second probe request frame to the first device based on the MAC address of the first device and the channel used by the first device, wherein the second probe request frame comprises a first character string;
      receiving, by the terminal, a second probe response frame sent by the first device, wherein the second probe response frame comprises a second character string obtained after the first device encrypts the first character string; and
      decrypting, by the terminal, the second character string based on the PSK, to obtain a decrypted second key, and when the decrypted second character string is the same as the first character string, determining, by the terminal, the PSK as the key used for establishing the P2P connection corresponding to the input operation.

6. The method according to claim 1, further comprising:
after establishing, by the terminal, the P2P connection to the first device based on the device information, sending, by the terminal to the first device through the P2P connection, a service set identifier (SSID) and a password of a Wi-Fi network that is accessed by the terminal, causing the first device to access the Wi-Fi network by using the SSID and the password.

7. The method according to claim 6, further comprising:
after the first device accesses the Wi-Fi network using the SSID and the password, sending, by the terminal, a registration request to a server, wherein the registration request requests the server to register the first device as a registered device of the target account; and
receiving, by the terminal, registration information sent by the server, and sending the registration information to the first device, causing the first device to register with the server as the registered device of the target account by using the registration information.

8. The method according to claim 6, further comprising:
after the first device accesses the Wi-Fi network using the SSID and the password, breaking, by the terminal, the P2P connection to the first device.

9. The method according to claim 6, further comprising:
after the first device accesses the Wi-Fi network by using the SSID and the password, while the P2P connection between the terminal and the first device is not broken, interacting, by the terminal, with the first device through the P2P connection.

10. The method according to claim 1, wherein the first device is one or more of a smart television, a smart air conditioner, a smart refrigerator, a smart speaker, a smart light, or a smart curtain.

11. A method, comprising:
establishing, by a first device, a peer to peer (P2P) connection to a terminal before accessing a network;
receiving, by the first device through the P2P connection, a control instruction sent by the terminal through a first wireless fidelity (Wi-Fi) channel in a time division multiplexing manner;
executing, by the first device, the control instruction;
after establishing, by the first device, the P2P connection to the terminal before accessing the network obtaining, by the first device, a service set identifier (SSID) and a password of a wireless fidelity (Wi-Fi) network from the first device through the P2P connection; and
accessing, by the first device, the Wi-Fi network by using the SSID and the password through a second Wi-Fi channel, wherein the first Wi-Fi channel is used to support the P2P connection between the first device and the terminal, and the second Wi-Fi channel is used to support interaction between the first device and an access point in the Wi-Fi network.

12. The method according to claim 11, wherein establishing, by the first device, the P2P connection to the terminal before accessing the network comprises:
negotiating, by the first device, with the terminal about a Wi-Fi protocol used for establishing the P2P connection;
negotiating, by the first device, with the terminal about a key used for establishing the P2P connection; and
establishing, by the first device, the P2P connection to the terminal according to the negotiated Wi-Fi protocol and the key.

13. The method according to claim 11, further comprising:
after accessing, by the first device, the Wi-Fi network using the SSID and the password obtaining, by the first device, registration information sent by the terminal; and
registering, by the first device, with a server through the Wi-Fi network as a registered device of a target account by using the registration information.

14. A terminal, comprising:
a touchscreen, comprising a touch sensor and a display;
a communications interface;
one or more processors;
one or more memories; and
one or more computer programs, wherein the one or more computer programs are stored in the one or more memories, the one or more computer programs comprise instructions, and when the instructions are executed by the terminal, the terminal is enabled to perform:
receiving an input operation of beginning a process of adding a new device to a target account by a user;
obtaining device information of a to-be-added first device in response to the input operation, wherein the device information comprises a media access control (MAC) address of the first device;
establishing a peer-to-peer (P2P) connection to the first device based on the device information;
after successfully establishing the P2P connection to the first device, displaying the first device as an online device of the target account;
receiving a control operation entered by the user on the first device; and
sending a control instruction to the first device through the P2P connection in response to the control operation.

15. The terminal according to claim 14, wherein obtaining the device information of the to-be-added first device comprises:
scanning a two-dimensional code of the first device; and
obtaining the device information of the first device from the two-dimensional code.

16. The terminal according to claim 14, wherein establishing the P2P connection to the first device based on the device information comprises:
negotiating, based on the device information, with the first device about a wireless fidelity (Wi-Fi) protocol used for establishing the P2P connection corresponding to the input operation; and
establishing the P2P Wi-Fi connection to the first device according to the negotiated Wi-Fi protocol.

17. The terminal according to claim 16, wherein when the instructions are executed by the terminal, the terminal is further enabled to perform:
before establishing the P2P Wi-Fi connection to the first device according to the negotiated Wi-Fi protocol, negotiating, based on the device information, with the first device about a key used for establishing the P2P connection this time corresponding to the input operation.

18. The terminal according to claim 17, wherein the device information further comprises a pre-shared key (PSK) of the first device and a channel used by the first device; and
wherein negotiating, based on the device information, with the first device about the Wi-Fi protocol used for establishing the P2P connection corresponding to the input operation comprises:

sending a first probe request frame to the first device based on the MAC address of the first device and the channel used by the first device, wherein the first probe request frame comprises a negotiation request, and the negotiation request negotiates with the first device about the Wi-Fi protocol used for establishing the P2P connection corresponding to the input operation;

receiving a first probe response frame sent by the first device, wherein the first probe response frame comprises an identifier that is of the Wi-Fi protocol and that is determined by the first device; and determining, based on the identifier of the Wi-Fi protocol, the Wi-Fi protocol used for establishing the P2P connection corresponding to the input operation; and wherein negotiating, based on the device information, with the first device about the key used for establishing the P2P connection corresponding to the input operation comprises:

sending a second probe request frame to the first device based on the MAC address of the first device and the channel used by the first device, wherein the second probe request frame comprises a first character string;

receiving a second probe response frame sent by the first device, wherein the second probe response frame comprises a second character string obtained after the first device encrypts the first character string; and decrypting the second character string based on the PSK, to obtain a decrypted second character string, and when the decrypted second character string is the same as the first character string, determining, by the terminal, the PSK as the key used for establishing the P2P connection corresponding to the input operation.

* * * * *

UNITED STATES PATENT AND TRADEMARK OFFICE
CERTIFICATE OF CORRECTION

PATENT NO. : 12,167,481 B2
APPLICATION NO. : 17/629971
DATED : December 10, 2024
INVENTOR(S) : Yi et al.

Page 1 of 1

It is certified that error appears in the above-identified patent and that said Letters Patent is hereby corrected as shown below:

In the Claims

In Column 24, in Claim 17, Line 58, after "connection" delete "this time".

Signed and Sealed this
Fourth Day of February, 2025

Coke Morgan Stewart
*Acting Director of the United States Patent and Trademark Office*